US008661307B2

(12) United States Patent
Jitsukawa et al.

(10) Patent No.: US 8,661,307 B2
(45) Date of Patent: Feb. 25, 2014

(54) TRANSMITTER DEVICE, COMMUNICATION SYSTEM, AND COMMUNICATION METHOD

(75) Inventors: Daisuke Jitsukawa, Kawasaki (JP); Jianming Wu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 447 days.

(21) Appl. No.: 13/177,191

(22) Filed: Jul. 6, 2011

(65) Prior Publication Data

US 2011/0271162 A1 Nov. 3, 2011

Related U.S. Application Data

(63) Continuation of application No. PCT/JP2009/000129, filed on Jan. 15, 2009.

(51) Int. Cl.
*H04L 1/18* (2006.01)

(52) U.S. Cl.
USPC .......................................... 714/748; 375/295

(58) Field of Classification Search
CPC ..................................................... H04L 1/0004
USPC .......................................... 375/295; 714/748
See application file for complete search history.

(56) References Cited

U.S. PATENT DOCUMENTS

| 6,865,233 | B1 * | 3/2005 | Eriksson et al. | 375/261 |
|---|---|---|---|---|
| 7,289,574 | B2 * | 10/2007 | Parolari | 375/295 |
| 7,386,277 | B2 * | 6/2008 | Cho et al. | 455/69 |
| 8,205,126 | B2 * | 6/2012 | Singh et al. | 714/748 |
| 8,270,426 | B2 * | 9/2012 | Choi et al. | 370/437 |
| 8,341,482 | B2 * | 12/2012 | Terry et al. | 714/748 |
| 8,446,882 | B2 * | 5/2013 | Lee et al. | 370/335 |
| 2003/0097629 | A1 | 5/2003 | Moon et al. | |
| 2005/0008026 | A1 | 1/2005 | Tanaka et al. | |
| 2005/0204251 | A1 | 9/2005 | Moon et al. | |
| 2010/0014474 | A1 | 1/2010 | Miki et al. | |
| 2010/0220663 | A1 | 9/2010 | Sawahashi et al. | |

FOREIGN PATENT DOCUMENTS

| EP | 1 496 638 | 1/2005 |
|---|---|---|
| GB | 2 382 285 | 5/2003 |
| JP | 2000-188609 | 7/2000 |
| JP | 2003-229813 | 8/2003 |
| JP | 2005-33399 | 2/2005 |
| JP | 2006-345363 | 12/2006 |
| JP | 2007-300258 | 11/2007 |
| JP | 2008-92378 | 4/2008 |

OTHER PUBLICATIONS

Notice of Rejection Grounds issued for corresponding Japanese Application No. 2010-546450, mailed Oct. 9, 2012, with partial English translation.
International Search Report issued for corresponding International Patent Application No. PCT/JP2009/000129, mailed Mar. 31, 2009.

* cited by examiner

*Primary Examiner* — Esaw Abraham
(74) *Attorney, Agent, or Firm* — Myers Wolin, LLC

(57) ABSTRACT

In a communication system, a transmitter device transmits data to a receiver device for performing error-correcting decoding processing by combining received data and retransmitted data. The transmitter device selects one of a first set of schemes of an M number of modulation and coding schemes as a modulation and coding scheme (MCS) of first data according to communication quality information obtained from the receiver device when the first data is initially transmitted, and selects one of a second set of schemes of an N number of MCSs (N<M) according to the communication quality information when the first data is retransmitted. The transmitter device generates a control signal including information indicating the selected MCS so that an amount of information of the MCS selected from the second set of schemes is less than an amount of information of the MCS selected from the first set of schemes.

6 Claims, 7 Drawing Sheets

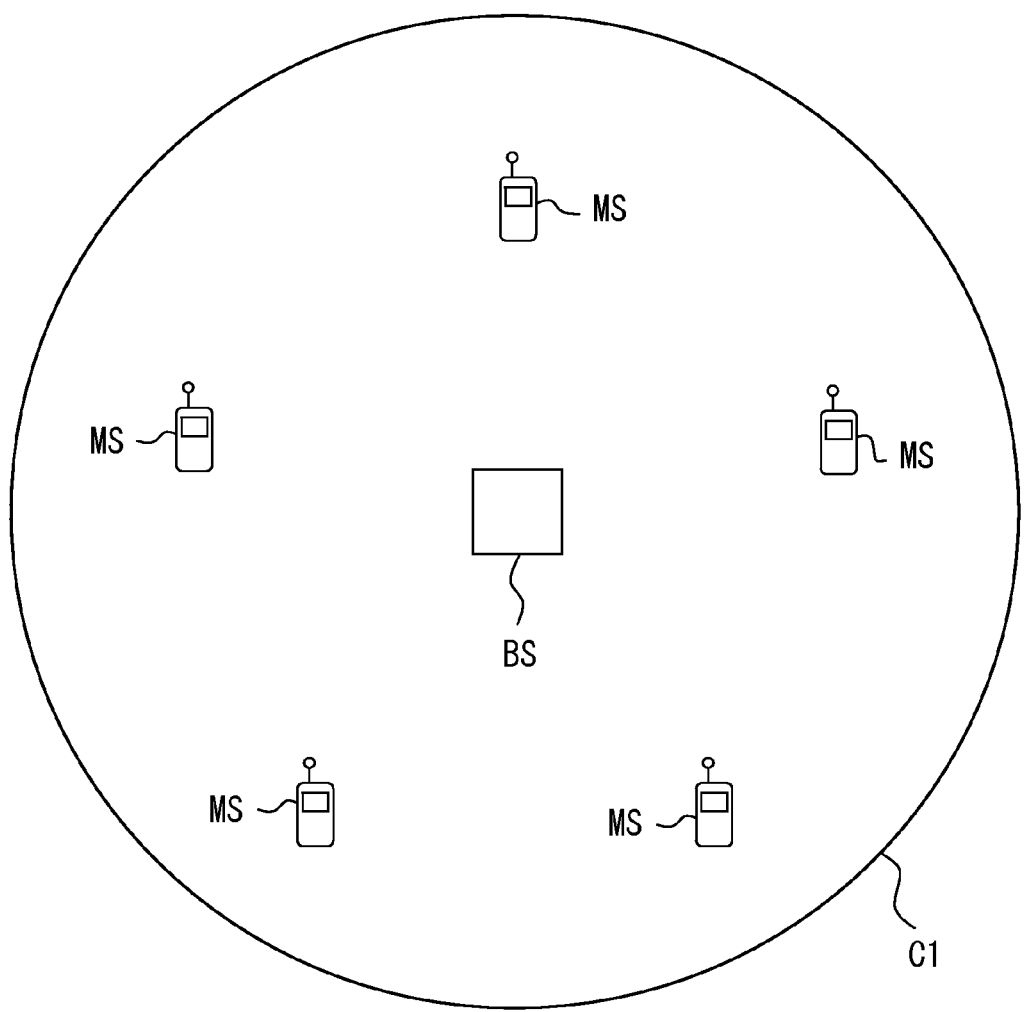
F I G. 1

F I G. 4

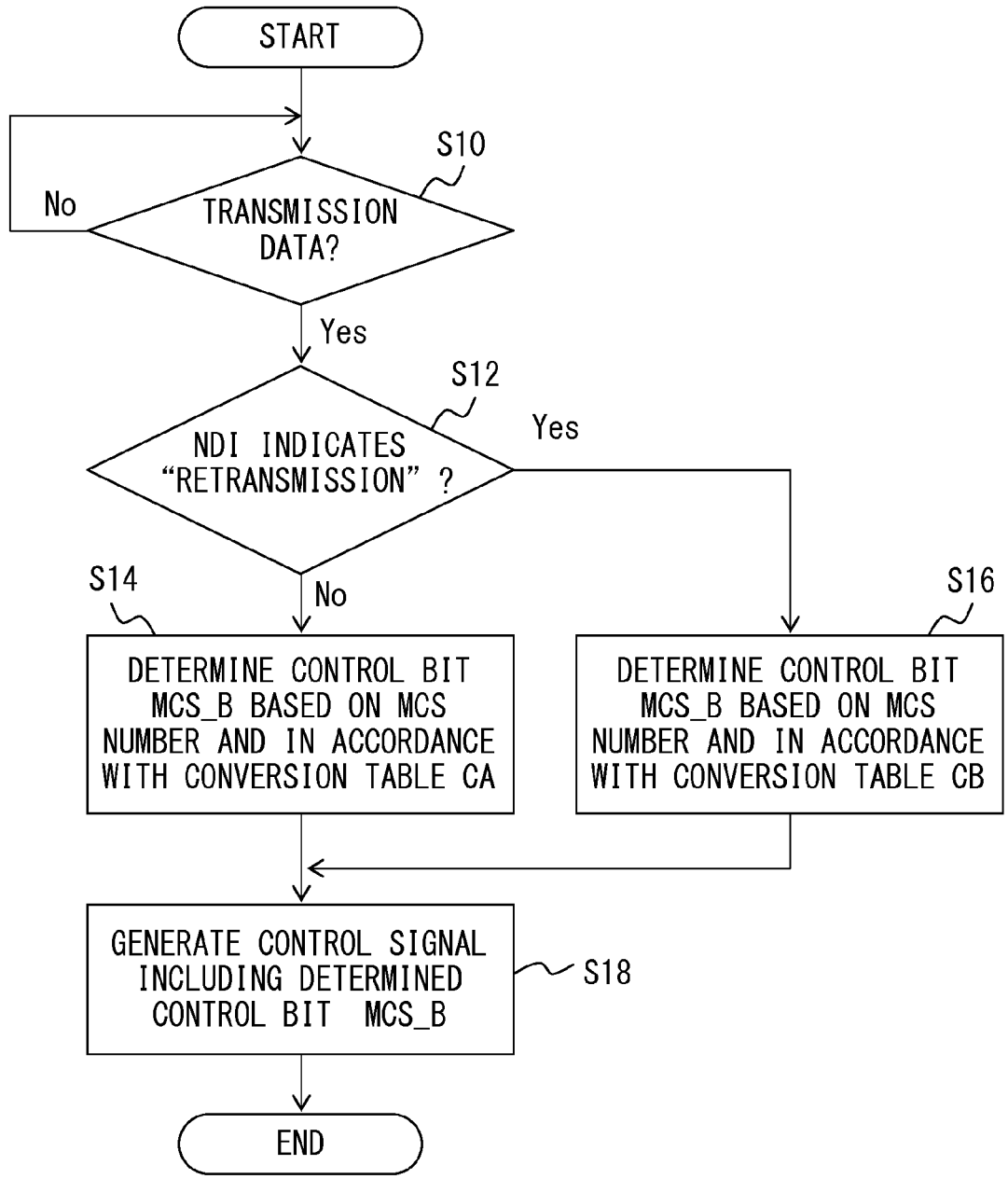
F I G. 5

|  | CA | CB |
|---|---|---|
| MCS NUMBER | MCS_B (INITIAL TRANSMISSION) | MCS_B (RETRANSMISSION) |
| 0 | 00000 | — |
| ... | ... | — |
| 7 | 00111 | — |
| 8 | 01000 | 00 |
| 9 | 01001 | — |
| 10 | 01010 | 01 |
| 11 | 01011 | — |
| 12 | 01100 | 10 |
| 13 | 01101 | — |
| ... | ... | — |
| 31 | 11111 | — |

TRANSMITTER DEVICE, COMMUNICATION SYSTEM, AND COMMUNICATION METHOD

CROSS-REFERENCE TO RELATED APPLICATIONS

This application is a continuation application of International PCT Application No. PCT/JP2009/000129, filed on Jan. 15, 2009, now pending, the contents of which are herein wholly incorporated by reference.

FIELD

The embodiments discussed herein are related to a communication technology in which a data signal and a control signal associated with the data signal are transmitted and received between a transmitter device and a receiver device.

BACKGROUND

In wireless communication systems such as High Speed Downlink Packet Access (HSDPA) and Long Term Evolution (LTE) that have been developed in recent years, Adaptive Modulation and Coding Schemes (AMCS), a technology to adaptively control the modulation and coding schemes in response to communication quality in a Channel Quality Indicator (CQI) etc. has been adopted. Signal to Noise Ratio (SNR), Signal to Interference Ratio (SIR) and Signal to Interference plus Noise Ratio (SINR) are examples of known CQIs.

An explanation of the AMCS with an example of a downlink from a wireless base station (hereinafter referred to as "base station") to a mobile station is provided below. Specifically, the mobile terminal regularly notifies the base station of the CQI indicating communication quality of the downlink from the base station to the mobile station. In the base station, plural modulation and coding schemes (combinations of modulation schemes and coding ratios) are prepared, and in response to the CQI from the mobile station, one of the plural modulation and coding schemes is selected. Here, for example, when the CQI is large (i.e., under a favorable communication environment), a modulation scheme such as 64 Quadrature Amplitude Modulation (QAM) that is susceptible to interference but is highly efficient in transmission is selected. When the CQI is small (i.e., under an unfavorable communication environment), for example, a modulation scheme such as Quadrature Phase Shift Keying (QPSK) that is resistant to interference but has a low transmission efficiency is selected. According to this AMCS, the base station can realize high transmission efficiency in the downlinks to mobile stations in response to the communication environments between each of the mobile stations.

A technology relating to the above-described AMCS is described in Japanese Laid-open Patent Publication No. 2006-345363.

SUMMARY

According to an aspect of the embodiment, a transmitter device transmits data to a receiver device for performing error-correcting decoding processing by combining received data and retransmitted data. The transmitter device includes a selection unit and a control signal generation unit. The selection unit selects one of a first set of schemes of an M number of modulation and coding schemes as a modulation and coding scheme of first data according to communication quality information obtained from the receiver device when the first data is initially transmitted, and selects one of a second set of schemes of an N number of modulation and coding schemes according to the communication quality information when the first data is retransmitted. N is smaller than M. The control signal generation unit generates a control signal including information indicating the selected modulation and coding scheme so that an amount of information of the modulation and coding scheme selected from the second set of schemes is less than an amount of information of the modulation and coding scheme selected from the first set of schemes.

According to another aspect of the embodiment, a communication system includes a first communication device for performing error-correcting decoding processing by combining received data and retransmitted data and a second communication device for transmitting data to the first communication device. A communication method in the communication system includes: receiving communication quality information from the first communication device, by the second communication device; selecting a first modulation and coding scheme of a first set of schemes of an M number of modulation and coding schemes according to the communication quality information when the first data is initially transmitted and performing modulation and coding on the first data by means of the first modulation and coding scheme, by the second communication device; generating a first control signal including information indicating the first modulation and coding scheme and transmitting the first control signal to the first communication device, by the second communication device; selecting a second modulation and coding scheme of a second set of schemes of an N number of modulation and coding schemes according to the communication quality information received from the first communication device when the first data is retransmitted, and performing modulation and coding on the first data by means of the second modulation and coding scheme, N being smaller than M, by the second communication device; and generating a second control signal including information indicating the second modulation and coding scheme so that an amount of information of the second control signal is less than the amount of information of the first control signal and transmitting the second control signal to the first communication device, by the second communication device.

According to further aspect of the embodiment, a communication system includes a first communication device for performing error-correcting decoding processing by combining received data and retransmitted data and a second communication device for transmitting data to the first communication device. The first communication device and the second communication device determines a modulation and coding scheme according to communication quality information with an identical rule when data is retransmitted. A communication method in the communication system includes: receiving first communication quality information from the first communication device, by the second communication device; determining a first modulation and coding scheme according to the first communication quality information and performing modulation and coding on the first data by means of the first modulation and coding scheme when the first data is initially transmitted, by the second communication device; generating a first control signal indicating the first modulation and coding scheme and transmitting the first control signal to the first communication device with the first data, by the second communication device; generating a second control signal not including information indicating a modulation and coding scheme of the first data and transmitting the second control signal to the first communication device when the first data is retransmitted, by the second communication device; and determining a modulation and coding scheme of the first data according to second communication quality information transmitted to the second communication device within a specific period of time and demodulating the retransmitted first data, by the first communication device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram illustrating a wireless communication system of the embodiment;

FIG. 4 is a diagram illustrating an example of a conversion table of Modulation and Coding Scheme (MCS) numbers and control bits in the embodiment;

FIG. 5 is a flowchart illustrating generation processing of a control signal in the embodiment;

FIG. 6 is a diagram illustrating another example of a conversion table of MCS numbers and control bits in the embodiment.

DESCRIPTION OF EMBODIMENTS

Figure 2:
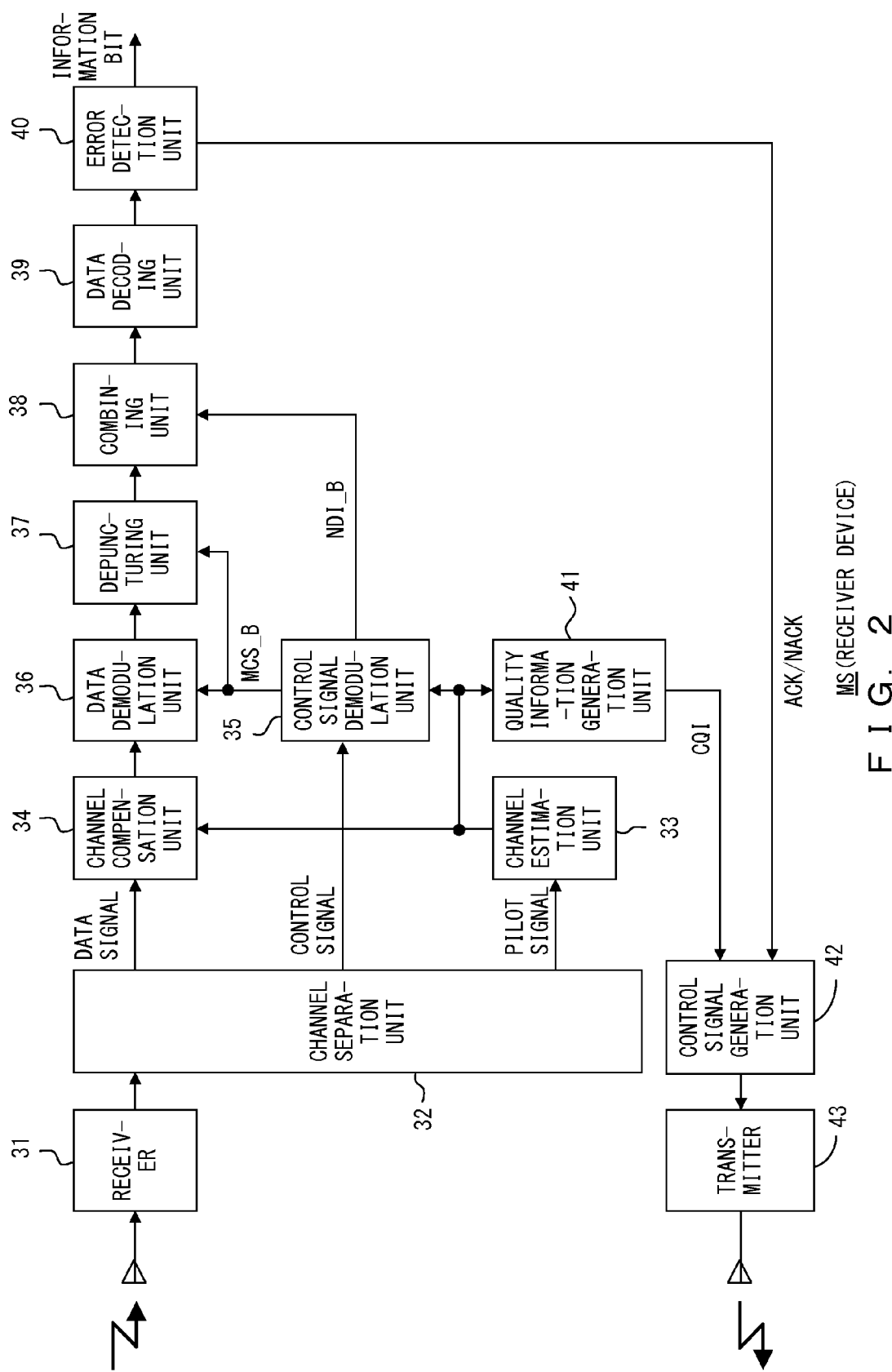
FIG. 2 is a block diagram illustrating a configuration of a mobile station of the embodiment.

As described above, in a communication system employing AMCS, when a transmitter device (e.g., a base station) transmits data to a receiver device (e.g., a mobile station), a control signal including information on a modulation and coding scheme selected by the AMCS is attached to the data and transmitted with the data. As a result, the received data can be accurately demodulated in the receiver device according to the information on the modulation and coding scheme included in the received control signal.

However, since such a control signal is defined for each mobile station (user), an amount of information in the control signal increases with the increase in the number of users, and data transmission efficiency is reduced relative to these increases. In particular, when the data reception fails in the receiver device, the control signal attached to the data is retransmitted, further reducing the transmission efficiency.

Preferred embodiments of the present invention will be explained with reference to accompanying drawings.

In each of the following embodiments, a wireless communication system including a transmitter device or a wireless base station serving as the second communication device and a receiver device or a mobile station serving as the first communication device is explained as a communication system according to one of the embodiments of the present invention.

(1) First Embodiment (1-1) Wireless Communication System of the Present Embodiment FIG. 1 is a diagram illustrating a wireless communication system of the present embodiment. As illustrated in FIG. 1, the wireless communication system of the present embodiment includes a wireless base station (BS) and plural mobile stations (MSs) that are present in a service area (cell C1) of the wireless base station. The following description is provided on the assumption that downlink communication is occurring from the wireless base station (transmitter device) to the mobile stations (receiver devices). It should be noted that the wireless base station is simply described as a "base station" in the following description.

In the wireless communication system of the present embodiment, a Hybrid Auto Repeat Request (HARQ) is adapted to the communication between the base station and the mobile stations. The HARQ can enhance the transmission efficiency and the transmission quality in digital signal transmissions. With the HARQ, the transmitter device transmits a data block of information bits encoded by using an error-correction code. When the data block is not properly received at the receiver device, the transmitter device transmits another data block created in accordance with the same information bits, and the receiver device properly acquires the original information bits from these plural data blocks.

As typical schemes of an HARQ, an Incremental Redundancy (IR) scheme and a Chase Combining scheme have been known. Either one of the schemes can be employed in the present embodiment. With the IR scheme, for example, the encoding ratio of the data block to be decoded in the receiver device becomes smaller every time the transmitter device retransmits a data block, and consequently error correction capability in decoding can be improved.

In this wireless communication system, a modulation and coding scheme (hereinafter referred to as an MCS) of the transmission data transmitted to the mobile stations is determined in the base station by using AMCS. In other words, plural MCSs are prepared in advance in the base station, and an MCS is adaptively selected according to the channel condition information (hereinafter referred to as CQI) from a mobile station. It should be noted that the CQI is communication quality information of the downlink from the base station to the mobile station.

In this wireless communication system, a control signal including information of the selected MCS (a control bit MCS_B described later) is transmitted to the mobile station together with a data signal (hereinafter arbitrarily abbreviated as "data"). Here, when the data signal is not properly decoded in the mobile station, the base station retransmits the data signal (data retransmission). However, the amount of information relating to an MCS in the data retransmission is less than the amount in the case in which the data signal is initially transmitted (new data transmission).

(1-2) Configuration of Base Station and Mobile Station

Figure 3:
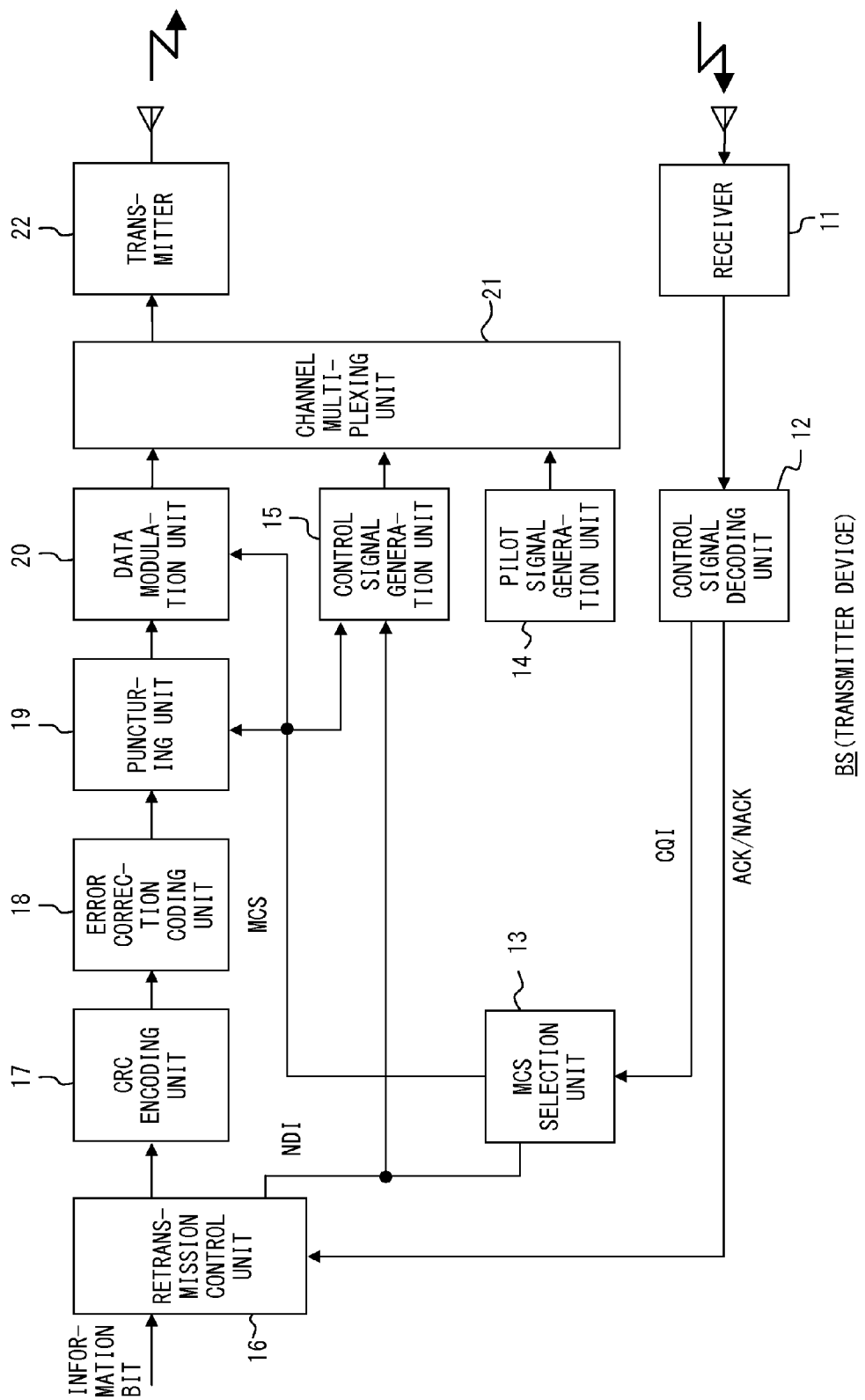
FIG. 3 is a block diagram illustrating a configuration of a base station of the embodiment.

Next, the configurations of the base station (transmitter device) and the mobile station (receiver device) in the wireless communication system of the present embodiment are explained with reference to FIG. 2 and FIG. 3. FIG. 2 is a block diagram illustrating a configuration of the mobile station. FIG. 3 is a block diagram illustrating a configuration of the base station.

Configuration of Mobile Station (Receiver Device)

As illustrated in FIG. 2, a mobile station includes a receiver 31, a channel separation unit 32, a channel estimation unit 33, a channel compensation unit 34, a control signal demodulation unit 35, a data demodulation unit 36, a depuncturing unit 37, a combining unit 38, a data decoding unit 39, an error detection unit 40, a quality information generation unit 41, a control signal generation unit 42, and a transmitter 43. The channel separation unit 32, the channel estimation unit 33, the channel compensation unit 34, the control signal demodulation unit 35, the data demodulation unit 36, the depuncturing unit 37, the combining unit 38, the data decoding unit 39, the error detection unit 40, the quality information generation unit 41, and the control signal generation unit 42 are realized by a processor such as a digital signal processor (DSP), a central processing unit (CPU) or the like.

The receiver 31 includes components such as a band-limiting filter, a low noise amplifier (LNA), a local frequency oscillator, a quadrature demodulator, an Automatic Gain Control (AGC) amplifier, and an Analog to Digital (A/D) converter, and converts received an RF signal into a digital baseband signal.

The channel separation unit 32 separates a data signal, a control signal, and a pilot signal from the baseband signal obtained by the receiver 31. In a case in which an Orthogonal Frequency Division Multiple Access (OFDMA) communication system is employed, for example, in this channel separation unit 32, after removing a Guard Interval (GI), encoded symbol strings for each subcarrier are generated by Fast Fourier Transform (FFT) processing with a prescribed FFT window setting. Then, separation of the data signal, the control signal and the pilot signal, all of which are inserted in a prescribed subcarrier, is performed.

The channel estimation unit 33 performs channel estimation processing based on the pilot signal (pilot symbol). In the channel estimation processing, channel status information (CSI) of a link from the base station to the mobile station is calculated by computing a correlation value between the received and obtained pilot signal and a known pilot signal. The channel compensation unit 34 performs channel compensation of the data signal (data symbol) by using the CSI calculated by the channel estimation unit 33. In a case in which the OFDMA communication system is employed, for example, channel compensation of each subcarrier and each OFDM symbol is performed, and possible phase rotation and the like on the transmission path can be compensated.

The control signal demodulation unit 35 demodulates the control signal separated by the channel separation unit 32. The control signal demodulation unit 35 outputs a control bit MCS_B, which indicates an MCS and is included in the control signal, to the data demodulation unit 36 and the depuncturing unit 37. The control signal demodulation unit 35 also outputs a control bit NDI_B, which indicates an New Data Indicator (NDI) and is included in the control signal, to the combining unit 38.

The data demodulation unit 36 demodulates data symbols in accordance with the MCS corresponding to the control bit MCS_B. The depuncturing unit 37 inserts a bit string (all "0" for example) so that the encoding ratio becomes a ratio indicated by the MCS corresponding to the control bit MCS_B and generates a data block that is to undergo error correction. It should be noted that the size of the inserted bit string corresponds to the size of the bit string deleted during the puncturing in the transmitter device.

The combining unit 38 is provided to perform HARQ and includes a buffer inside. When the control bit NDI_B from the control signal demodulation unit 35 indicates "initially transmitted", the combining unit 38 stores the data block from the depuncturing unit 37 in the buffer. When the control bit NDI_B from the control signal demodulation unit 35 indicates "retransmitted", the combining unit 38 combines the data block from the depuncturing unit 37 with the data block in the buffer, or in other words, adds these data blocks in units of bits.

It should be noted that plural buffers are provided in the combining unit 38 in accordance with a required number of processes, and the combining processing is performed by designating a process number corresponding to the data clock to be processed.

The data decoding unit 39 decodes the data block combined by the combining unit 38 (combined data block) with a decoding method corresponding to the error-correction coding performed in the transmitter device. In addition, the error detection unit 40 performs error detection by using Cyclic Redundancy Check (CRC) bits included in the combined data block. In the error detection unit 40, when the decoding is properly performed in the data decoding unit 39, an ACK signal is output to the control signal generation unit 42 and data (information bits) extracted by decoding is output to the upper layer. Meanwhile, when the decoding is not properly performed in the data decoding unit 39, the error detection unit 40 outputs a NACK signal to the control signal generation unit 42.

The quality information generation unit 41 extracts a known reference signal, such as the pilot signal, and a preamble signal, separated by the channel separation unit 32, and calculates the CQI of communication quality information according to the reference signal. The quality information generation unit 41 measures SNR, SIR, SINR and others for the CQI. The calculated CQI is output to the control signal generation unit 42.

The control signal generation unit 42 generates a control signal including either an ACK signal or a NACK signal, and a signal indicating the CQI (hereinafter referred to as a CQI signal). This control signal, after undergoing a prescribed transmission processing, is transmitted to the base station from the transmitter 43.

Configuration of Base Station (Transmitter Device)

As illustrated in FIG. 3, a base station includes a receiver 11, a control signal decoding unit 12, an MCS selection unit 13, a pilot signal generation unit 14, a control signal generation unit 15, a retransmission control unit 16, a CRC encoding unit 17, an error correction coding unit 18, a puncturing unit 19, a data modulation unit 20, a channel multiplexing unit 21, and a transmitter 22. The control signal decoding unit 12, the MCS selection unit 13, the pilot signal generation unit 14, the control signal generation unit 15, the retransmission control unit 16, the CRC encoding unit 17, the error correction coding unit 18, the puncturing unit 19, the data modulation unit 20, and the channel multiplexing unit 21 are realized by a processor such as a DSP, a CPU or the like.

The receiver 11 converts the received RF signal into the digital baseband signal and extracts the encoded control signal by prescribed channel separation processing. The control signal decoding unit 12 decodes the encoded control signal. The control signal decoding unit 12 outputs either the ACK signal or NACK signal included in the control signal to the retransmission control unit 16, and also outputs the CQI signal to the MCS selection unit 13.

In the MCS selection unit 13, an MCS number corresponding to the value of the CQI indicated by the CQI signal is selected from plural MCSs. The correspondence relationship between the CQI value and the MCS number is defined in advance in the MCS selection unit 13. Here, for example, when the CQI is large (i.e., under a favorable communication environment), an MCS number corresponding to a modulation scheme such as 64 QAM that is susceptible to interference but is highly efficient in transmission is selected. When the CQI is small (i.e., under an unfavorable communication environment), for example, an MCS number corresponding to a modulation scheme such as QPSK that is resistant to interference but has a low transmission efficiency is selected.

In the MCS selection unit 13, the selectable MCSs at the time of initially transmitting data are different from the selectable MCSs at the time of retransmitting data. This point is explained with reference to FIG. 4. FIG. 4 is a diagram illustrating an example of a conversion table for determination of the control bit MCS_B, which is referred to by the control signal generation unit 15. It should be noted that further explanation of FIG. 4 is provided later.

In the example illustrated in FIG. 4, at the time of initially transmitting data, the MCS corresponding to the CQI value is selectable from among all MCSs corresponding to 32 MCS numbers (0 to 31). On the other hand, at the time of retransmitting data, MCS corresponding to the CQI value is selected from among four MCSs corresponding to the MCS numbers 4, 12, 20 and 28 (MCS numbers in which MCS_B is written). It is therefore possible that the optimal MCS in accordance with CQI cannot be selected at the time of retransmitting data.

In the MCS selection unit 13, correspondence relations between individual CQIs and MCS numbers are defined in each of the cases of initially transmitting data and of retransmitting data, and one of the correspondence relations is adopted according to the NDI reported from the retransmission control unit 16.

Although the MCSs to be selected can be freely set in the present embodiment, in the downlink of the OFDMA communication system, for example, any one of the modulation schemes QPSK, 16QAM, and 64QAM and any one of the encoding techniques (encoding ratios) 1/2, 2/3, 3/4, and 5/6 can be combined to set plural MCSs. The MCS number selected by the MCS selection unit 13 is sent to notify the puncturing unit 19, a data modulation unit 20, and the control signal generation unit 15.

The retransmission control unit 16 is provided to perform HARQ and includes a buffer inside. This buffer stores data that had been transmitted (information bit in FIG. 3). The retransmission control unit 16, when an ACK signal is provided from the control signal decoding unit 12, retrieves new data (information bit in FIG. 3) and writes the new data in the buffer as well as outputting the new data to the CRC encoding unit 17. Meanwhile, when a NACK signal is provided from the control signal decoding unit 12, the retransmission control unit 16 reads out data from the buffer and outputs the data to the CRC encoding unit 17.

In addition, the retransmission control unit 16 notifies the MCS selection unit 13 and the control signal generation unit 15 of the NDI indicating "initially transmitted" when the output data is new data (i.e., when processing based on the ACK signal is performed). The retransmission control unit 16 notifies the MCS selection unit 13 and the control signal generation unit 15 of the NDI indicating "retransmitted" when the output data is the data read out from the buffer (i.e., when processing based on the NACK signal is performed).

It should be noted that plural buffers are provided in the retransmission control unit 16 in accordance with a required number of processes, and the combining processing is performed by designating a process number corresponding to the data clock to be processed.

The CRC encoding unit 17 performs CRC encoding for error detection of the input data. The error correction coding unit 18 encodes data from the CRC encoding unit 17 for error correction at a specific encoding ratio.

The puncturing unit 19 performs processing of deleting a portion of bits so that the data has the encoding ratio indicated by the selected MCS based on the MCS number provided from the MCS selection unit 13. The data modulation unit 20 modulates input data in accordance with the modulation scheme indicated by the selected MCS according to the MCS number provided from the MCS selection unit 13.

The control signal generation unit 15 converts the MCS number reported from the MCS selection unit 13 into the control bit MCS_B indicating an MCS. The control signal generation unit 15 generates a control signal including this control bit MCS_B and the control bit NDI_B indicating the NDI reported from the retransmission control unit 16, and outputs the control signal to the channel multiplexing unit 21.

It should be noted that in the control signal generation unit 15, methods of conversion from the MCS number into the control bit MCS_B are different in cases of initially transmitting data and of retransmitting data.

The channel multiplexing unit 21 multiplexes the data signal from the data modulation unit 20, the control signal from the control signal generation unit 15, and the pilot signal generated in the pilot signal generation unit 14, and generates a baseband signal to be transmitted. When the OFDMA communication system is employed, for example, a signal in each subcarrier is converted into a time domain signal by means of GI addition and Inverse Fast Fourier Transform (IFFT) processing.

The transmitter 22 includes a Digital to Analog (D/A) converter, a local frequency oscillator, a mixer, a power amplifier, a filter, and others, and radiates the baseband signal after up-converting the baseband signal from the channel multiplexing unit 21 from a baseband frequency into a radio frequency.

(1-3) Control Signal Generation Processing in Base Station

Next, the control signal generation processing performed in the control signal generation unit 15 in the base station is explained with reference to FIG. 4 and FIG. 5. FIG. 4 is a diagram illustrating an example of the conversion table for determination of the control bit MCS_B, which is referred to by the control signal generation unit 15. FIG. 5 is a flowchart of the control signal generation processing.

The conversion table in FIG. 4 is used for determining the control bit MCS_B from the MCS number reported from the MCS selection unit 13, and includes a conversion table CA adopted at the time of initially transmitting data and a conversion table CB adopted at the time of retransmitting data. The 32 MCS numbers (0 to 31) in FIG. 4 are placed in the order of the resistance of the modulation and coding scheme of the corresponding MCS to the interference. It should be noted that the MCS numbers in FIG. 4 are a mere example, and it is obvious that the MCS numbers can be properly set in accordance with the specification of AMCS of the employed communication system.

In the example in FIG. 4, the MCS number sent to notify the control signal generation unit 15 is any of the 32 MCS numbers (0 to 31) at the time of initially transmitting data and is any of the four MCS numbers from 4, 12, 20 and 28 (the MCS numbers having MCS_B written) at the time of retransmitting data. The control bit MCS_B is set as 5-bit data (00000 to 11111) corresponding to each of the 32 MCS numbers at the time of initially transmitting data and is set as 2-bit data (00, 01, 10, 11) corresponding to each of four MCS numbers at the time retransmitting data.

The flowchart of FIG. 5 is explained. The algorithm illustrated by FIG. 5 is realized by the processor such as a DSP, a CPU or the like.

In FIG. 5, when the transmission data is present (Yes in step S10), the control signal generation unit 15, firstly, confirms whether the NDI reported from the retransmission control unit 16 indicates "initially transmitted" or "retransmitted" (step S12). When the NDI indicates "initially transmitted" (i.e., not "retransmitted"), the control bit MCS_B (5 bits) is determined in accordance with the conversion table CA in FIG. 4, for example, according to the notified MCS number (step S14). On the other hand, when the NDI indicates "retransmitted", the control bit MCS_B (2 bits) is determined in accordance with the conversion table CB in FIG. 4, for example, according to the notified MCS number (step S16). In addition, the control signal generation unit 15 generates a control signal including the control bit MCS_B determined in either step S14 or S16 (step S18).

In other words, in the control signal generation unit 15, the control bit MCS_B indicating the MCS is 5-bit data at the time of initially transmitting and is 2-bit data at the time of retransmitting. Therefore the amount of information in the control signal at the retransmission is less than the amount of information at the time of an initial transmission.

It should be noted that in FIG. 4, although the number of the MCS numbers selectable in the MCS selection unit 13 at the time of retransmission is limited to four, any number of MCS numbers can be set as long as the amount of information in the control bit MCS_B at the time of retransmission is less than the amount at the time of an initial transmission. In addition, the MCS that should be selectable from among the MCS numbers set for the initial transmission at the time of retransmission can be arbitrarily determined. The example of FIG. 4 (four MCS numbers including 4, 12, 20, 28) is an example in which four dispersed MCS numbers are set so that an MCS corresponding to a wide range of CQI values can be selected.

As explained above, in the wireless communication system of the present embodiment, since the base station serving as a transmitter device reduces the amount of information of the control bit (the above MCS_B) indicating the selection result of MCS at the time of retransmitting data, the amount of information of the control signal transmitted to the mobile station serving as a receiver device is reduced. As a result, the transmitter device can increase the amount of information of the transmission data relative to the reductions, and the data transmission efficiency can be consequently improved.

Here, because the number of selectable MCSs is limited at the time of retransmitting data in the base station, it is possible that the MCS selected in accordance with the CQI from the mobile station at the time of retransmission is not necessarily optimal. However, the HARQ is adopted to this wireless communication system, and error correcting capability in the mobile station is improved at the time of retransmission. Therefore reception quality loss is controlled even if the MCS is not optimal.

(2) Second Embodiment

Another embodiment is explained in the following description by covering only the differences from the first embodiment.

In the base station (transmitter device) in the wireless communication system of the second embodiment, the MCS selectable at the time of retransmitting data is adaptively set based on the MCS selected at the time of initially transmitting the data. In other words, since the communication environment does not significantly change between the time of initially transmitting data and the time of retransmitting the data in many cases, it is more likely that the optimal MCS is selected at the time of retransmission when an MCS number selected at the time of an initial transmission is set as a reference and the MCS number close to the reference MCS number is set as a selectable MCS at the time of retransmitting data.

In the following description, a method of setting an MCS at the time of retransmission in the second embodiment is explained with reference to FIG. 3 and FIG. 6. FIG. 6 is a diagram illustrating an example of another conversion table for determination of the control bit MCS_B.

FIG. 6 illustrates an example in which the MCS number selected in the MCS selection unit 13 at the time of initially transmitting data (hereinafter referred to as reference MCS number) is 10. FIG. 6 depicts that at the time of retransmission, the reference MCS number: 10 and smaller and larger MCS numbers: 8 and 12 are set as the selectable MCS numbers (MCS number having MCS_B written).

In the base station of the present embodiment, the MCS selection unit 13 has a buffer inside, and when the NDI reported from the retransmission control unit 16 indicates "initially transmitted", the MCS number selected in response to the initial transmission of data is stored in the buffer as a reference MCS number. When the NDI reported from the retransmission control unit 16 indicates that the data is "retransmitted", the MCS selection unit 13 reads out the reference MCS number from the buffer and this MCS number (hereinafter referred to as the first MCS number), an MCS number that is larger by a prescribed number than the reference MCS number (hereinafter referred to as the second MCS number), and an MCS number that is smaller by a prescribed number than the reference MCS number (hereinafter referred to as the third MCS number) are set as the MCS numbers selectable at the time of retransmission. The buffer can be reset when, for example, an ACK signal is received.

In the control signal generation unit 15, the conversion table CB is adaptively set by associating it with the above first through third MCS numbers at a time of data retransmission as illustrated in FIG. 6. In the example illustrated in FIG. 6, the first MCS number is "10", the second MCS number is "12", and the third MCS number is "8". Of course, it is possible to add other selectable MCS numbers.

As it is obvious from the comparison between FIG. 6 and FIG. 4, in this embodiment, even though the number of selectable MCSs is smaller than that of FIG. 4, smaller intervals of the selectable MCS numbers are given and therefore the accuracy of the MCS selected at the time of retransmitting data is improved under the assumption that the communication environment does not significantly change between the time of initially transmitting data and the time of retransmitting the data.

(3) Third Embodiment

The other embodiment of the present invention is explained in the following description by covering only the differences from the first embodiment.

In the base station in the wireless communication system of the third embodiment, MCS is not selected at the time of retransmitting data, and a control signal is transmitted to the mobile station without including the control bit MCS_B that indicates MCS. As a result, the amount of information in the control signal can be further reduced, while further improving the data transmission efficiency over the other embodiments described above.

In this embodiment, at the time of data retransmission, the mobile station (the first communication device) and the base station (the second communication device) have the same rule to determine the modulation and coding scheme based on the communication quality information. In other words, this embodiment is set up so that the same MCS is selected in the two stations according to the same CQI at the time of data retransmission. As a result, at the time of data retransmission, without having to obtain the control bit MCS_B that indicates an MCS from the base station, the mobile station can predict an MCS for data at the time of retransmission according to the CQI that the mobile station itself had sent to the base station within a specific period of time (most recently) so that the retransmitted data can be accurately demodulated.

In this embodiment, since the mobile station selects the MCS for the retransmitted data according to the CQI transmitted to the base station within a specific period of time (most recently), a proper MCS in accordance with a communication environment can be determined. In addition, since the HARQ is adopted to the wireless communication system of this embodiment, the error correction capability in the mobile station is improved at the time of retransmitting data, and therefore reception quality loss is controlled.

The above-described communication method of the present embodiment is particularly effective when a control signal transmitted with data at the time of initially transmitting the data was not able to be properly received in the mobile station. In LTE, for example, the mobile station recognizes whether or not wireless resources are allocated to the mobile station itself depending on whether the control signal can be decoded or not. Therefore, in the above case, the mobile station does not recognize that wireless resources are allocated to the mobile station itself. Then the reception processing is not performed and neither an ACK signal nor a NACK signal is transmitted to the base station. Nevertheless, the base station sometimes erroneously determines that a NACK signal is received. The communication method of the present embodiment in such a case is explained below with reference to the flow in FIG. 7.

Figure 7:
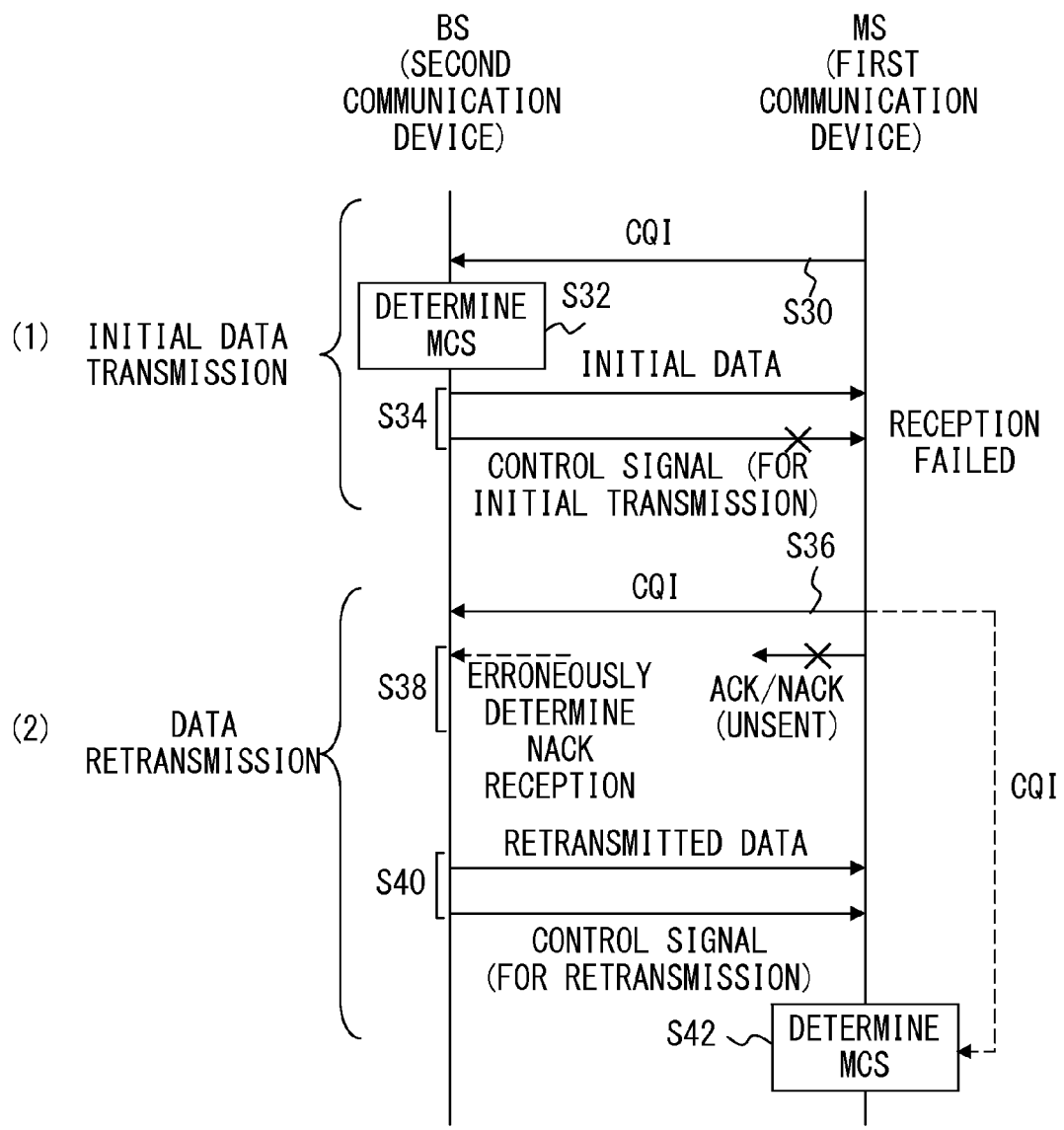
FIG. 7 is a diagram illustrating a flow of signals between the base station and the mobile station in the embodiment.

In FIG. 7, a mobile station (MS) regularly notifies a base station (BS) of CQI (steps S30 and S36). The base station determines an MCS according to the most recent CQI reported in step S30 at the time of initially transmitting data (step S32). Afterwards the new data and a control signal including a control bit MCS_B corresponding to the determined MCS are transmitted to the mobile station, but here a case in which the control signal is not properly received in the mobile station is simulated (step S36). In this case, the control signal cannot be obtained in the mobile station, and new data transmitted in step S34 cannot be received.

In the mobile station, reception processing of new data is not performed and neither an ACK signal nor a NACK signal is transmitted to the base station. Nevertheless the base station erroneously determines that a NACK signal is received in the base station (step S38). In this case, the base station transmits the retransmitted data to the mobile station (step S40), but the control signal (for retransmission) transmitted with the retransmitted data does not include the control bit MCS_B corresponding to an MCS in the present embodiment.

Under such a condition, the mobile station determines an MCS for the retransmitted data according to the CQI transmitted to the base station within a specific period of time (the most recently) (in FIG. 7, CQI transmitted in step S36, for example) at the time of retransmitting data (step S42), and demodulates the retransmitted data. Since the present embodiment is configured so that the same MCS is selected based on the same CQI in the base station and the mobile station at the time of retransmitting data, the retransmitted data can be properly demodulated in the mobile station even if information relating to the MCS selected in the base station at the time of data retransmission cannot be obtained in the mobile station.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmitter device for transmitting data to a receiver device for performing error-correcting decoding processing by combining received data and retransmitted data, the transmitter device comprising:
a processor configured to select one of a first set of schemes of an M number of modulation and coding schemes as a modulation and coding scheme of first data according to communication quality information obtained from the receiver device when the first data is initially transmitted, to select one of a second set of schemes of an N number of modulation and coding schemes according to the communication quality information when the first data is retransmitted, N being smaller than M, and to generate a control signal including information indicating the selected modulation and coding scheme so that an amount of information of the modulation and coding scheme selected from the second set of schemes is less than an amount of information of the modulation and coding scheme selected from the first set of schemes.

2. The transmitter device according to claim 1, wherein a plurality of modulation and coding schemes are set as the second set of schemes from among the first set of schemes.

3. The transmitter device according to claim 1, wherein a first modulation and coding scheme selected when the first data is initially transmitted, a second modulation and coding scheme having a higher resistance than the first modulation and coding scheme, and a third modulation and coding scheme having a lower resistance than the first modulation and coding scheme are set as the second set of schemes from among the first set of schemes.

4. A communication system comprising:
a first communication device configured to perform error-correcting decoding processing by combining received data and retransmitted data; and
a second communication device configured to transmit data to the first communication device,
wherein the first communication device includes
a first processor configured to generate communication quality information relating to communication with the second communication device as a subject to be transmitted to the second communication device, and
wherein the second communication device includes
a second processor configured to select one of a first set of schemes of an M number of modulation and coding schemes as a modulation and coding scheme of first data according to the communication quality information when the first data is initially transmitted, to select one of a second set of schemes of an N number of modulation and coding schemes according to the communication quality information when the first data is retransmitted, N being smaller than M, and to generate a control signal including information indicating the selected modulation and coding scheme so that an amount of information of the modulation and coding scheme of the first data selected from the second set of schemes is less than an amount of information of the modulation and coding scheme selected from the first set of schemes.

5. A communication method in a communication system including a first communication device for performing error-correcting decoding processing by combining received data and retransmitted data and a second communication device for transmitting data to the first communication device, the communication method comprising:
- receiving communication quality information from the first communication device, by the second communication device;
- selecting a first modulation and coding scheme of a first set of schemes of an M number of modulation and coding schemes according to the communication quality information when the first data is initially transmitted and performing modulation and coding on the first data by means of the first modulation and coding scheme, by the second communication device;
- generating a first control signal including information indicating the first modulation and coding scheme and transmitting the first control signal to the first communication device, by the second communication device;
- selecting a second modulation and coding scheme of a second set of schemes of an N number of modulation and coding schemes according to the communication quality information received from the first communication device when the first data is retransmitted, and performing modulation and coding on the first data by means of the second modulation and coding scheme, N being smaller than M, by the second communication device; and
- generating a second control signal including information indicating the second modulation and coding scheme so that an amount of information of the second control signal is less than the amount of information of the first control signal and transmitting the second control signal to the first communication device, by the second communication device.

6. A communication method in a communication system including a first communication device for performing error-correcting decoding processing by combining received data and retransmitted data and a second communication device for transmitting data to the first communication device, the first communication device and the second communication device determining a modulation and coding scheme according to communication quality information with an identical rule when data is retransmitted, the communication method comprising:
- receiving first communication quality information from the first communication device, by the second communication device;
- determining a first modulation and coding scheme according to the first communication quality information and performing modulation and coding on the first data by means of the first modulation and coding scheme when the first data is initially transmitted, by the second communication device;
- generating a first control signal indicating the first modulation and coding scheme and transmitting the first control signal to the first communication device with the first data, by the second communication device;
- generating a second control signal not including information indicating a modulation and coding scheme of the first data and transmitting the second control signal to the first communication device when the first data is retransmitted, by the second communication device; and
- determining a modulation and coding scheme of the first data according to second communication quality information transmitted to the second communication device within a specific period of time and demodulating the retransmitted first data, by the first communication device.

* * * * *